(12) United States Patent
Van Stralen et al.

(10) Patent No.: US 6,621,855 B1
(45) Date of Patent: Sep. 16, 2003

(54) SCALABLE SPREAD-SPECTRUM SIGNAL DETECTION AND ACQUISITION PROCESSOR

(75) Inventors: Nick Andrew Van Stralen, Clifton Park, NY (US); Richard August Korkosz, Rotterdam Junction, NY (US); Gary Jude Saulnier, Rexford, NY (US); John Erik Hershey, Ballston Lake, NY (US); Naofal Mohammed Wassel Al-Dhahir, Niskayuna, NY (US)

(73) Assignee: Lockhead Martin Corporation, Bethesda, MD (US)

( * ) Notice: Subject to any disclaimer, the term of this patent is extended or adjusted under 35 U.S.C. 154(b) by 0 days.

(21) Appl. No.: 09/318,853

(22) Filed: May 26, 1999

(51) Int. Cl.⁷ .................................................. H04B 1/69
(52) U.S. Cl. ....................................... 375/142; 375/147
(58) Field of Search ................................. 375/130, 134, 375/136, 142, 143, 147, 150, 152, 349, 343; 370/335, 336, 342, 345, 442, 441

(56) References Cited

U.S. PATENT DOCUMENTS 5,761,239 A * 6/1998 Gold et al. ................. 375/150
5,790,591 A * 8/1998 Gold et al. ................. 375/142
6,198,765 B1 * 3/2001 Cahn et al. ................. 375/142
6,370,130 B1 * 4/2002 Zhou et al. ................. 370/335

* cited by examiner

Primary Examiner—Mohammed H. Ghayour
(74) Attorney, Agent, or Firm—Duane Morris LLP

(57) ABSTRACT

A method allows determination of the presence of, the frequency of, and or the timing of a coded signal distributed in time, as for example a direct-sequence spread-spectrum signal or a signal having a coded header. According to the method, the received signal is correlated (16, 216, 316) with small sections of the spreading or header code, to produce partial correlations, as for example a 1024-chip spreading code is correlated in eight- or sixteen-chip portions. The result of each partial correlation is delayed (32, 232, 332/350) by an amount which results in temporal congruence or simultaneous occurrence of the partial correlations at a Doppler processor. The processor processes the simultaneous partial correlations, to produce signals which recur in the appropriate frequency bin at the recurrence rate of the spreading code. The frequency bin identifies the frequency of the received signals, and the time of the appearance of the signals at the bins is indicative of the time.

10 Claims, 5 Drawing Sheets

SCALABLE SPREAD-SPECTRUM SIGNAL DETECTION AND ACQUISITION PROCESSOR

FIELD OF THE INVENTION

This invention relates to spread-spectrum communications systems, and more particularly to arrangements for determining the frequency or signal timing of such signals.

BACKGROUND OF THE INVENTION

It is often necessary to detect, acquire, and track the frequency and time of a received direct-sequence spread-spectrum (DS/SS) signal in order to reliably de-spread and demodulate the received signal. In direct-sequence spread-spectrum, the transmitted information bits are multiplied or spread by a high rate pseudorandom (PRN) spreading sequence. In many DS/SS systems, detection and acquisition of received signal timing and frequency is difficult because the signal energy is well below the associated noise level. In code-division multiple access systems in which multiple users access the same frequency bandwidth by use of different spreading codes having advantageous cross-correlation properties, the noise contribution from the codes of the other users adds to the thermal noise to exacerbate the detection and acquisition problem.

Ordinary prior-art approaches to the acquisition problem are based mainly on correlation or matched filtering operations performed on the received signal, variants of which are termed sliding correlation, serial search, and recursion aided sequential estimation. In the presence of a signal, many of these techniques ultimately generate a signal correlation or autocorrelation function, the peak of which should indicate signal timing. However, the noise and other interferences associated with the signal may make determination of the correlation peak difficult. Frequency errors or cumulative phase errors between the information carrier and the local frequency will tend to decrease the magnitude and increase the spread of the peak correlation.

A standard technique for acquisition of signals in the presence of frequency errors or frequency shifts is to use frequency bin searching, either by use of a plurality of correlators operating in parallel, one for each frequency of the received signal, or by searching frequency serially, or both. The use of one correlator for each possible frequency requires a great deal of hardware (or equivalent software), but provides fast acquisition. Serial searching of the frequencies requires only one correlator, but may require significant time to complete a search, especially considering that each attempted correlation may take as long as the recurrence period of the spreading code. Thus, there is a tradeoff between speed and complexity; two correlators could be used in parallel to search using various different frequency hypotheses, thereby presumably cutting the search time in half (by comparison with a single comparator using serial search) by a doubling of the complexity of the equipment.

Correlation or filtering is well known, and can be implemented by many techniques, as for example by Finite Impulse Filters (FIR) or by use of Fast Fourier Transforms (FFT).

Improved techniques for determination of the presence of spread-spectrum signals, or of the frequency and or time of spread-spectrum signals, is desired.

SUMMARY OF THE INVENTION

A method according to an aspect of the invention is for detecting the presence of, the frequency or the timing of a received spread-spectrum signal encoded at a known nominal chip rate with a known PRN sequence. The method includes the step of sampling the received signal at an integer multiple, including the multiple unity, of the chip rate, to thereby generate sampled received signals. The sampled received signals are correlated with at least first and second different portions of the PRN sequence with which the signals were originally encoded, to produce correlation outputs when correlation occurs. The samples of the correlation outputs are delayed by an amount equal to the time difference between the different portions of the PRN sequence, to thereby produce a plurality of time-congruent samples. The plurality of time-congruent samples are processed to determine at least the frequency of the received signal.

In one mode of performing the method according to the invention, the step of sampling is performed in a binary fashion, so that the sampled received signals have values of only zero and one. In this method, the step of correlating includes the step of correlating the sampled received signals with the first and second portions includes the step of correlating the sampled received signals with first and second contiguous portions of the PRN sequence. The step of delaying the samples may include the step of delaying the samples by increments of the duration of one of the portions of the PRN sequence.

DESCRIPTION OF THE INVENTION

The process of coherently correlating the received signal over a full period of the code as in the prior art may not be fully satisfactory in the presence of frequency variations such as those due to Doppler shift, because the frequency shift tends to reduce the amplitude of the correlation peak. In some situations in which the signal noise is near or below the noise level, the reduced-amplitude correlation peak may not be detectable. According to an aspect of the invention, small portions of the spreading (or chipping) sequence are correlated, so that the phase error across the code portion being correlated is small. The correlation of the code segments is followed by additional correlation, and by frequency and or timing detection.

Figure 1:
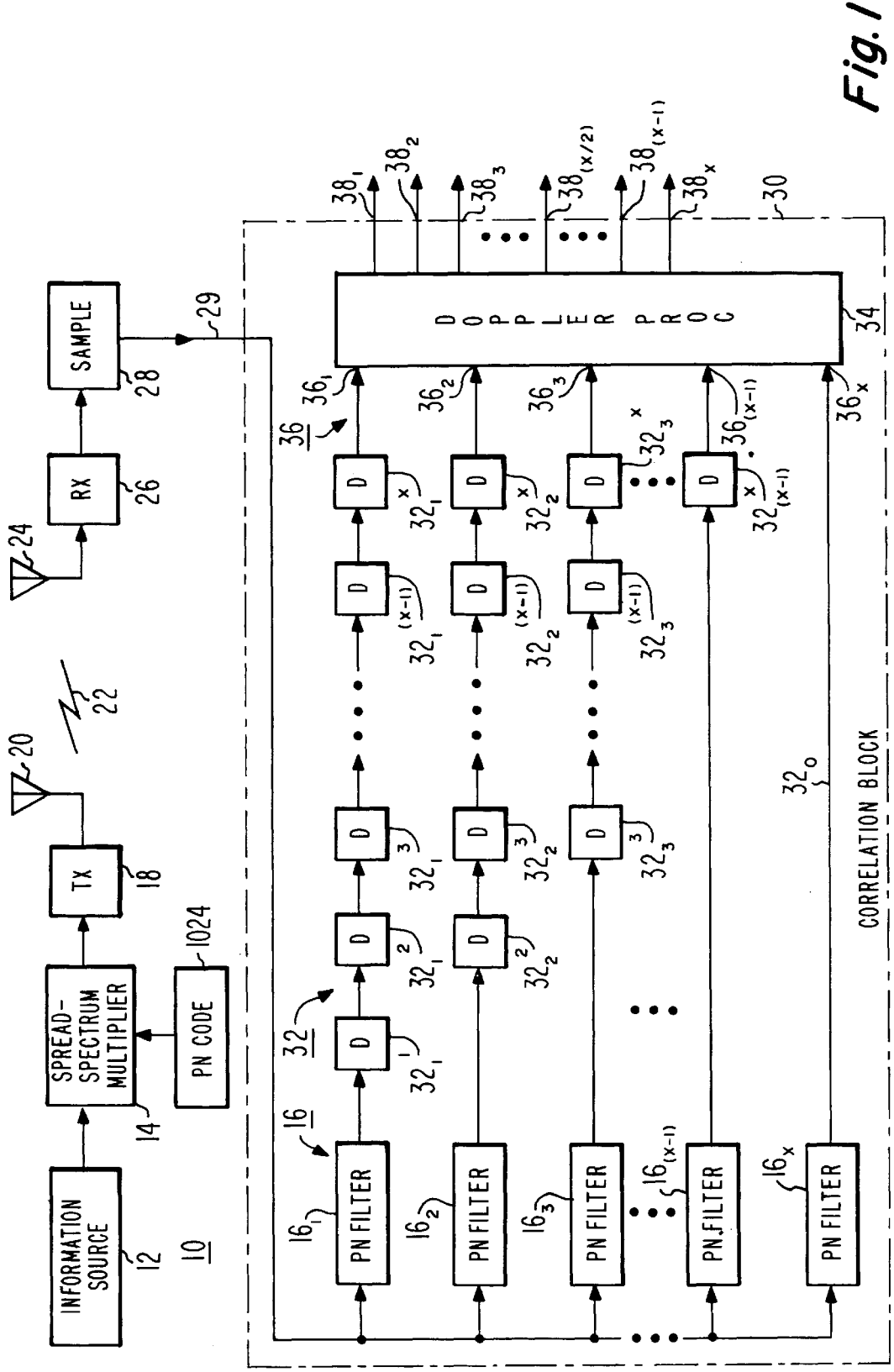
FIG. 1 is a simplified block diagram of a communication system including a correlation block according to an aspect of the invention.

In FIG. 1, a communication system 10 includes a source 12 of digital information to be transmitted. The information is applied from source 12 to a spread-spectrum multiplier 14, which also receives a pseudorandom (PRN) code from a PRN code source 1024. In an illustrative example of the invention, the PRN sequence has a length of 1024 chips to provide a processing or spreading gain of about 30 dB. Each complete PRN sequence occurs in the duration of one bit of information code. The spread-spectrum information is applied from multiplier 14 to a transmitter (TX) 18, which performs the usual functions, which may include power amplification and frequency upconversion. The output from TX 18 is applied to an antenna 20, for transmission over an "air" path 22 to a receiving antenna 24.

The spread-spectrum signal received by receiving antenna 24 of FIG. 1 is applied to a receiver (RX) 26, which performs the usual receiver functions. The receiver functions may include low-noise amplification, filtering, frequency downconversion, and the like. The received signals from RX 26 are sampled and possibly converted into digital form in a block 28. The sampled signals are applied by way of a signal path 29 to a partial correlation block 30 according to an aspect of the invention.

More particularly, the sampled signals from sampling block 28 of FIG. 1 are applied in parallel to an array or set 16 including a plurality of individual PRN filters designated $16_1, 16_2, 16_3, \ldots, 16_{(X-1)}, 16_X$. Each of the PRN filters of set 16 has a length of sixteen bits, and is matched to a different portion of the PRN sequence produced by code generator 1024; they are "partial" PRN filters. For the particular example in which the PRN code from generator 1024 has a duration or length of 1024 chips, and each of the PRN filters of set 16 has a length of 16 chips, there are a total of sixty-four individual PRN filters 16. Each of the individual PRN filters of set 16 responds to a corresponding portion of the full PRN code produced by PRN code generator 1024. For simplicity in FIG. 1, it is assumed that PRN filter $16_1$ responds or is matched to the first 16 chips of the full PRN code (that is, it responds to chips 0–15); filter $16_2$ responds to the second set of 16 chips of the full PRN code (that is, to chips 16–31); filter $16_3$ responds to the third set of 16 chips of the full PRN code (that is, to chips 32–47); filter $16_3$ responds to the third set of 16 chips of the full PRN code (that is, to chips 32–47); . . . ; filter $16_{(X-1)}$ responds to the $(x-1)^{th}$, or $63^{rd}$, set of 16 chips of the full PRN code (that is, to chips 992–1007); and filter $16_{(X)}$ responds to the $(x)^{th}$, or $64^{th}$, set of 16 chips of the full PRN code (that is, to chips 1008–1023).

With the above assumptions about which code portions the various PRN filters of set 16 of FIG. 1, PRN filter $16_1$ will be the first to respond to arrival of a new full 1024-bit PRN code, in that it responds to the first sixteen bits of the 1024-bit PRN code. At the time that the first 16 bits "fill" filter $16_1$, the filter produces a correlation peak. At a time later than the time of the correlation peak produced at the output of PRN filter $16_1$ by the duration of sixteen chips, the second PRN filter, which is PRN filter $16_2$, will respond to the second sixteen-bit segment of the full 1024-bit PRN code with a correlation peak, and PRN filter $16_1$ will not respond, since it is not matched to this second portion of the full PRN code. Similarly, at a time later than the time at which PRN filter $16_2$ responds by the duration of sixteen chips (which time is, of course, later by the duration of thirty-two chips than the time at which PRN filter $16_1$ responds), PRN filter $16_3$ responds to chips 32–47 of the full PRN code with a correlation peak. As will be understood from the above, at a yet later time, PRN filter $16_{(X-1)}$ will respond to its particular set of chips, and PRN filter $16_X$ responds sixteen-chip-durations later, at the end of the full PRN sequence. Thus, the responses of the PRN filters of set 16 occur in a time-progressive sequence, beginning at the uppermost PRN filter $16_1$ of set 16, and progressing to the lowermost PRN filter $16_X$. It should be noted that each PRN filter responds to each input chip with some value; at the time of full correlation of sixteen chips, the value or magnitude may be as great as sixteen, and the polarity or sign will be either plus or minus, according to the information bit with which the chips are associated. Thus, all of the sixty-four PRN filters of FIG. 1 continually produce output signals, but the values will in general not have a large magnitude except when the filter is matched to its particular code segment.

According to a further aspect of the invention, a delay arrangement 32 is provided for temporally aligning the responses of the PRN filters of set 16. More particularly, the earlier-responding ones of the PRN filters of set 16 have their responses delayed by a greater amount of time, and the later-responding ones of the PRN filters by a lesser amount of time, in order to bring the partial correlation responses of the PRN filters into temporal congruence. This is illustrated in FIG. 1, in which the correlation output signal from upper PRN filter $16_1$ progresses through sixty-three delay (D) elements $32_1^1, 32_1^2, 32_1^3, \ldots, 32_1^{(X-1)}, 32_1^x$ to an input port $36_1$ of a "Doppler" processor 34; the correlation output signal from second PRN filter $16_2$ progresses through sixty-two delay (D) elements $32_2^2, 32_2^3, \ldots, 32_2^{(X-1)}, 32_2^X$ to an input port $36_2$ of processor 34; the correlation output signal from third PRN filter $16_3$ progresses through sixty-one delay (D) elements $32_2^3, \ldots, 32_2^{(X-1)}, 32_2^X$ to an input port $36_3$ of processor 34; . . . ; the correlation output signal from $(X-1)^{th}$ PRN filter $16_{(X-1)}$ progresses through one delay (D) element $32_2^{(X-1)}$ to an input port $36_{(X-1)}$ of processor 34; and the correlation output signal from $X^{th}$ PRN filter $16_X$ progresses by a path $32_0$, without delay, to an input port $36_X$ of processor 34. With this arrangement, all of the correlation signals arrive at processor 34 essentially simultaneously. As mentioned above, the PRN filters of set 16 continually produce output signals, but the correlation peaks are brought into time coincidence. It should be noted that, while the full 1024-bit PRN code sequence is not correlated per se, at the time at which the correlation peaks arrive at processor 34, the entire 1024-bit sequence has been piecewise correlated, and the piecewise correlation is represented by the simultaneous occurrence of the partial correlation peaks at the set 36 of input ports of processor 34. The use of the term "Doppler" in connection with processor 34 refers to a use of the processor in determining the frequency of the received signal, but the term does not encompass other applications or utilities of processor 34, as described more particularly below.

The illustration of a plurality of delay elements, such as delay elements $32_1^1, 32_1^2, 32_1^3, \ldots, 32_1^{(X-1)}, 32_1^X$ associated with the first PRN filter $16_1$, is for purposes of explanation only, and those skilled in the art know that it may be preferable to provide a single delay element having the desired properties rather than a plurality of cascaded individual delays.

According to a further aspect of the invention, processor 34 of FIG. 1 correlates the correlation signals arriving at its set 36 of input ports, to provide the equivalent of correlation of the full or entire 1024-bit PRN sequence, with its attendant noise or processing gain advantages. More particularly, the processing of block 34 of FIG. 1 is a fast Fourier transform (FFT) or a discrete Fourier transform (DFT), well known in the art, which correlates the signals applied to its input ports of set 36, and which determines the frequency or frequencies of the input signals. Because even the well-known fast algorithm for performing the Fourier transform may take considerable time, the FFT or DFT processing in block 34 may profit from parallelization in order to gain a speed advantage. One such method of parallelization has been proposed by L Bhuyan and D. Agrawal in *Applications of SIMD Computers in Signal Processing*, National Computer Conference Proceedings, Houston, 1982, pp 135–142, incorporated herein by reference. Their method computes an N-point FFT, where $N=2^n$, using P processors, where $P=2^m$, $m \leq n$, sharing a common time-multiplexed bus. They assume that the basic FFT computational unit or "butterfly," consumes B time units and that a processor-to-memory or processor-from-memory data transfer consumes T time units. J. Hershey and R. Yarlagadda, in *Probabilistic Signal Processing*, Milcom '86, 1986, incorporated herein by reference, characterize Bhutan and Agrawal's result using a generalized parallelization model and show that the Speedup $S_p$, which is the ratio of (a) the time required for a single processor to perform a particular computational task to (b) the time it takes P processors working together to perform the same computation, may be written as $$S_p = \frac{1}{\frac{1}{P} + \frac{2m\tau}{nB}} \quad 1$$

thus allowing a speedup which approaches P as the dimensionless ratio τ/B approaches zero. More particularly, processor 34 sorts the frequencies into one of X bins, where X is 64 for the example. Each frequency bin is represented in FIG. 1 by a particular output port of a set 38 of output ports of processor 34. More particularly, an output signal appearing on a "center" output port $38_{(X/2)}$ (or $38_{32}$ in the particular example) represents the presence of an input signal at a center frequency, and an output signal appearing on one of the other output ports of set 38 represents the presence of an input signal at a frequency offset (higher or lower frequency) from the center frequency. Thus, the presence of a signal on output port $38_1$ might represent the presence of a signal at a frequency higher by 32 frequency increments than the center frequency, the presence of a signal on output port $38_2$ might represent a signal at a frequency higher by 31 frequency increments than the center frequency, and the presence of a signal on output port $38_3$ might represent the presence of a signal at a frequency higher by 30 frequency increments than the center frequency. Similarly, the presence of a signal on output port $38_X$ might represent a signal at a frequency lower by 32 frequency increments than the center frequency, and the presence of a signal on output port $38_{(X-1)}$ might represent the presence of a signal at a frequency lower by 31 frequency increments than the center frequency.

The correlation peaks occurring at the input ports of set 36 of input ports of processor 34 of FIG. 1 recur at the recurrence rate of the full PRN sequence (the 1024-bit sequence in the example). Thus, the signal appearing at an output port of set 38 of output ports of processor 34 recurs at the same rate. Thus, the presence of a spread-spectrum signal having a "single frequency" at the receiver 36 of FIG. 1 is indicated by the presence of a pulse or correlation peak occurring on a corresponding one of the frequency-bin output ports of set 38. In the real world, there may be expected to be some spreading of the responses, so that an input signal at a given frequency will result in a maximum response from the corresponding one of the frequency-bin output ports of set 38, but such an input signal will also tend to produce a less-than-maximum output signal from those output ports of set 38 which represent frequencies near the corresponding one. Thus, three or more "adjacent frequency" bins or output ports of set 38 may provide simultaneous responses, but may actually represent only one frequency. This ambiguity is easily corrected or ameliorated by selecting as the "correct" response that one of the responses which has the greatest absolute value. Thus, the processing (not illustrated) following the processor 34 of FIG. 1 may include one or more comparators which compare the relative absolute magnitudes, and selects as being the "true" output only that one of a set of adjacent outputs which has the maximum amplitude. Naturally, there may be situations in which frequency drifts occur which result in actual or true responses of mutually adjacent or contiguous filters (mutually adjacent or contiguous in a frequency sense, rather than in a physical sense).

Those skilled in the art will recognize that, in order for Doppler processor 34 to perform the abovedescribed functions, the partial PRN filters of set 16 must preserve phase information, and they must therefore be complex filters.

The correlation peaks which occur in one (or possibly more) of the frequency bins associated with the various output ports of set 38 of output ports of FIG. 1 occur once per complete PRN cycle. When one complete PRN cycle occurs in the interval of one bit of the information being carried over the communication system 10 of FIG. 1, one correlation peak appears at an output port of set 38 of output ports of processor 34. Thus, one correlation peak occurs at an output port during an interval corresponding to one bit of the information signal. When the information signal is binary (having but two possible states, such as zero and one), the binary state of the information signal is represented at the output of processor 34 by the sign or polarity of the correlation peak. Thus, if the correlation peak is positive, the binary state of the received information signal is thereby identified as being (say) logic one, and in that case a logic zero state is represented by a negative sign of the correlation peak. Thus, the information signal is available at the output of processor 34.

It should be noted that it is convenient in cases in which the spreading code is a power of 2, to make the Doppler processing in processor 34 be a power of two in size, and to use an FFT algorithm. In cases in which the spreading code cannot be divided so that the number of segments is a power of 2, DFTs can be used. The Doppler processing size or duration may be increased or decreased by applying the FFT algorithm over less or more than a full bit period of the information signal. Shortening of the Doppler processing window results in lower-amplitude correlation peaks and in coarser Doppler frequency bins, while lengthening of the window provides finer-resolution frequency bins, but may result in fluctuation of the peaks in the presence of frequency drifts.

The frequency range over which Doppler processor 34 can detect frequency of a user without aliasing depends upon the interval between input signals to the processor, which is termed D herein. Thus, the frequency range or bandwidth is established by 1/D. The granularity of resolution with which the frequency can be determined (the size of the frequency bins) is established by 1/T, where T=ND, where N is the number of samples applied to the Doppler processor (or in other words, the number of input ports of the processor). It should also be noted that processor 34 of FIG. 1 may respond to differences in timing between the partial-correlation peaks arriving at input ports of set 36 to determine relative phase of the arriving signals, as well as frequency.

Figure 2:
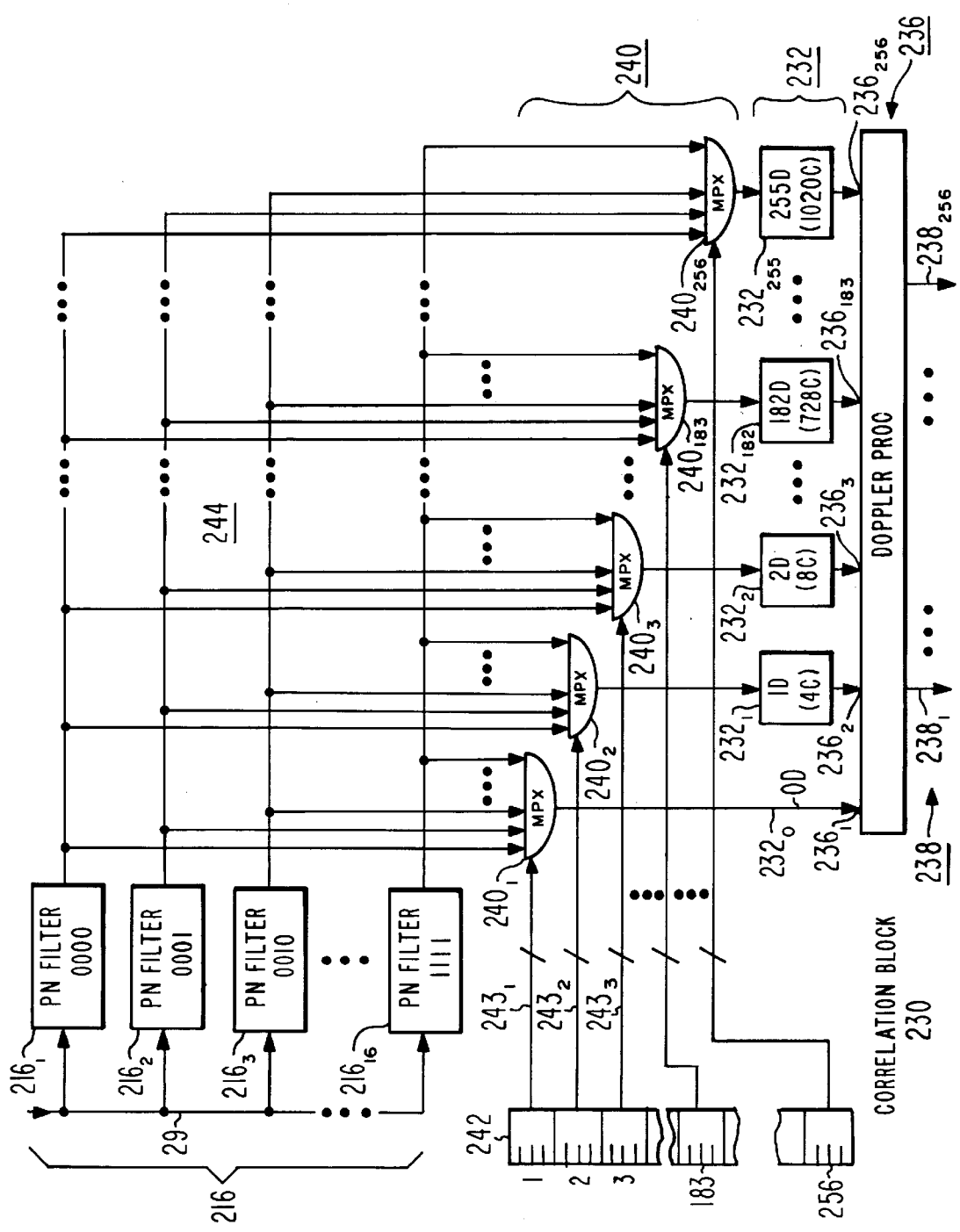
FIG. 2 is a simplified block diagram of a portion of the arrangement of FIG. 1, in which a different correlation block is substituted.

FIG. 2 is a simplified block diagram of a portion of the arrangement of FIG. 1, in which a partial correlation processor illustrated as a block 230 substitutes for block 30 of FIG. 1. In FIG. 2, the sampled received signals are applied over signal path 29 to a bank or set 216 of PRN filters $216_1$, $216_2$, $216_3$, ..., $216_{16}$. Each of the PRN filters of set 216 responds to a particular four-bit code, with filter $216_1$ being responsive to 0000, filter $216_2$ being responsive to 0001, filter $216_3$ being responsive to 0010, and so forth, until the last filter $216_{16}$ is responsive to the four-bit code 1111. Thus, all the possible numerical combinations 0, 1, 2, 3, 4, 5, 6, 7, 8, 9, 10, 11, 12, 13, 14, and 15, which it is possible to represent with a four-bit binary code, are represented by a PRN filter of set 216. In a system in which the code sequence to which the receiver is to respond may change from time to time, a set 240 of multiplexers controls the application of the correlation peaks to the delays of set 232 of delays, so that the PRN code, once selected, can be implemented without changing the PRN code for each of the filters of set 16 of FIG. 1. More particularly, suppose that the complete PRN spreading code to which the system is to respond has 1024 chips, so that there are 256 four-chip segments. The selection of 1024 chips in the example is for the purpose of simplification, and other numbers of chips may be used. All possible four-chip segments are represented by the PRN filters of set 216, so each four-chip segment of the 1024-chip spreading sequence will be responded to by one of the filters $216_1$, $216_2$, $216_3$, ..., $216_{16}$, and not by other filters of set 216.

Also in FIG. 2, the outputs of the various PRN filters of set 216 are coupled by way of a network of paths 244 to the input ports of a plurality of multiplexers, 256 in number, designated together as a set 240. Each multiplexer of set 240 has an input port coupled to the output port of each of the PRN filters of set 216. Thus, any one of the multiplexers of set 240 can access the output signal from any one of the sixteen PRN filters of set 216. The output of each multiplexer of set 240 of multiplexers is connected to a delay (D) element of a set 232 of delay elements. The number of delay elements is selected to provide any desired delay, in increments of the duration of four chips (in this example). Thus, one D equals 4 Chips or 4C. The outputs of the delay elements are coupled to the input ports of a set 236 of input ports of a Doppler processor 234. Processor 234, as with processor 34 of FIG. 1, performs frequency and time correlations, and produces its output signals on a set of ports 238.

The 1024-chip full PRN code to which each of the PRN filters of set 216 of FIG. 2 partially responds can have any desired sequence: the first four chips of the selected sequence may be 0000, 0001, 0010, 0011, ..., 1111, amounting to a total of sixteen possibilities for the first four chips. Any of the succeeding four-chip intervals of the complete PRN code may be selected to be any of the sixteen possible sequences. Thus, any of the filters of set 216 of PRN filters may respond to any of the four-bit sequences which occurs in the 1024-chip sequence. Consequently, any one of the partial PRN code filters of set 216 may be the "first" to respond among the various filters. Thus, it is not possible to preassign a particular delay of set 232 to any one of the filters of set 216, because the temporal "location" of the particular code in the complete PRN code will depend upon the code itself. In order to allow simple "software" adaptation of the structure to any desired PRN sequence, each multiplexer $240_1$, $240_2$, $240_3$, ..., $240_{16}$ is controlled by a static memory, suggested by element 242, which contains memory locations or addresses which are preloaded with information relating to the position in the entire PRN sequence at which each four-chip sequence occurs. Each of the 256 multiplexers requires a four-bit code to specify which of its sixteen input ports will be active.

For example, assume that the complete 1024-chip PRN code is 0001, ..., 1111, ..., 0000, 1111, 0010. With that assumption, the code of the first-occurring four-chip sequence is 0001, which is responded to by partial-PRN-code filter $216_2$. The total delay between the first and last chips of the sequence is 1024 chips, corresponding to 256 four-chip sequences. Consequently, the maximum delay is (1024−4=1020) chips or 255D. Thus, the maximum delay of 255D or 1020C should be applied to the correlation output signal from PRN filter $216_2$. This amount of delay is selected by the setting of multiplexer $240_{256}$ of FIG. 2, which is connected to delay element $232_{255}$ having a 1020-chip delay, to select as its active input port that port which connects to 0001 filter $216_2$. The selection of active input port of multiplexer $240_{256}$ is commanded by the current value stored in memory portion 256 of memory 242; with this selection, multiplexer $240_{256}$ cannot couple any signal other than 0001 to delay element $232_{255}$, so no signal other than 0001 can be applied through multiplexer $240_{256}$ to delay $232_{255}$. Thus, when the initial four-chip sequence 0001 of the complete 1024-chip spreading code arrives at correlation block 230, filter $216_2$ responds with a partial correlation peak, and the partial correlation peak is applied through a delay of 1020-chips-duration to a processor 234. Another four-chip code segment of the 1024-chip spreading code is the seventy-third such four-chip set to arrive. The seventy-third of the four-chip portions of the complete PRN code, in the above example, is 1111. Four-chip code 1111 is responded to by partial PRN filter $216_{16}$. Since filter $216_{16}$ responds to the seventy-third four-chip set to arrive at port 29, the coupling delay to the appropriate input port of set 236 of input ports of processor 234 is less than 1020 chips or 255D, and should be (255−73=182) D or 728 chips in duration. Consequently, that one of the multiplexers of set 240, the output port of which is associated with 728-chip delay element $232_{182}$, is controlled by portion 183 of memory 242 to select as the active multiplexer input port that port coupled to PRN filter $216_{16}$, responsive to 1111. Thus, the seventy-third four-chip increment (1111) of the PRN spreading sequence is applied by way of multiplexer $240_{183}$ and 728-chip delay element $232_{182}$ to input port $236_{183}$ of processor 234.

The next one of the four-chip sequences which is considered in the explanation is the antepenultimate (third from last) four-chip increment 0000, which is responded to by first partial PRN filter $216_1$. The partial correlation output signal from partial PRN filter $216_1$ requires a delay of eight chips of delay. The multiplexer associated with the eight-chip delay $232_2$ is multiplexer $240_3$, and memory 242 portion 3 is preprogrammed with multiplexer control information which is coupled over control path $243_3$ to multiplexer $240_3$, to cause the active input port of multiplexer $240_3$ to be the one connected by way of paths of network 244 to the output of PRN filter $216_1$. Consequently, when the antepenultimate four-chip portion 1111 of the signal arrives by way of signal path 29, PRN filter $216_1$ responds with a correlation peak or signal, and the correlation signal is routed through multiplexer $240_3$ and delay element $232_2$ to an input port $236_3$ of processor 234. The penultimate (next-to-last) four-chip portion of the exemplary sequence listed above is again 1111, which as described above is responded to by partial PRN sequence filter $216_{16}$. Since this is the penultimate of the four-chip sequences of chips in the example, the appropriate delay is by 1D or four chip intervals. A delay of four chip intervals is provided by delay element $232_1$. The multiplexer associated with delay element $232_1$ is multiplexer $240_2$. Portion 2 of memory 242 controls multiplexer $240_2$ to make active that one of its input ports which is connected to the output of partial PRN filter $216_{16}$. Consequently, the correlation response of filter $216_3$ is applied over 1D-delay path $232_1$ to an input port $236_2$ of processor 234. The last four-chip portion of the exemplary sequence listed above is again 0010, which is responded to by partial PRN sequence filter $216_3$. Since this is the last of the four-chip sequences of chips in the example, the appropriate delay is zero delay. Zero delay is provided by path $232_0$. The multiplexer associated with zero-delay path $232_0$ is multiplexer $240_1$. Portion 1 of memory 242 controls multiplexer $240_1$, to make active that one of its input ports which is connected to the output of partial PRN filter $216_3$. Consequently, the correlation response of filter $216_3$ is applied over zero-delay path $232_0$ to input port $236_1$ of processor 234. Since each four-chip sequence requires a different amount of delay, and each different delay is associated with only one multiplexer, there is no "overlap" or need to re-use any delay or any multiplexer for two different portions of the PRN sequence; the filters themselves, however, are re-used each time its four-bit sequence recurs. All of the desired correlation peaks or signals arrive simultaneously at the processor 234, and processor 234 can operate in the same way as processor 34 in the arrangement of FIG. 1. There are some stray paths in the arrangement of FIG. 2, as for example the second response to 1111 will be coupled through multiplexer $240_2$ as well as through multiplexer $240_{183}$, and the coupling of the first response to 1111 through multiplexer $240_{183}$ through multiplexer $240_2$. Such stray couplings of the partial correlation peaks or signals are coupled through delays of set 232 which cause them to arrive at processor 234 at noncoincident times, and their summations will not be strong.

As mentioned, a salient advantage of the arrangement of FIG. 2 is that the code can be set at the receiver by simply reprogramming memory 242 with the appropriate multiplexer information. Another advantage is that, for complete PRN codes which are long and for small number of partial code chips, as for example for a 1024-chip spreading code and for partial codes with four chips, the number of partial correlations can be reduced from 1024/4=256 in the arrangement of FIG. 1 to $2^4$=16 in an arrangement corresponding to that of FIG. 2.

Figure 3:
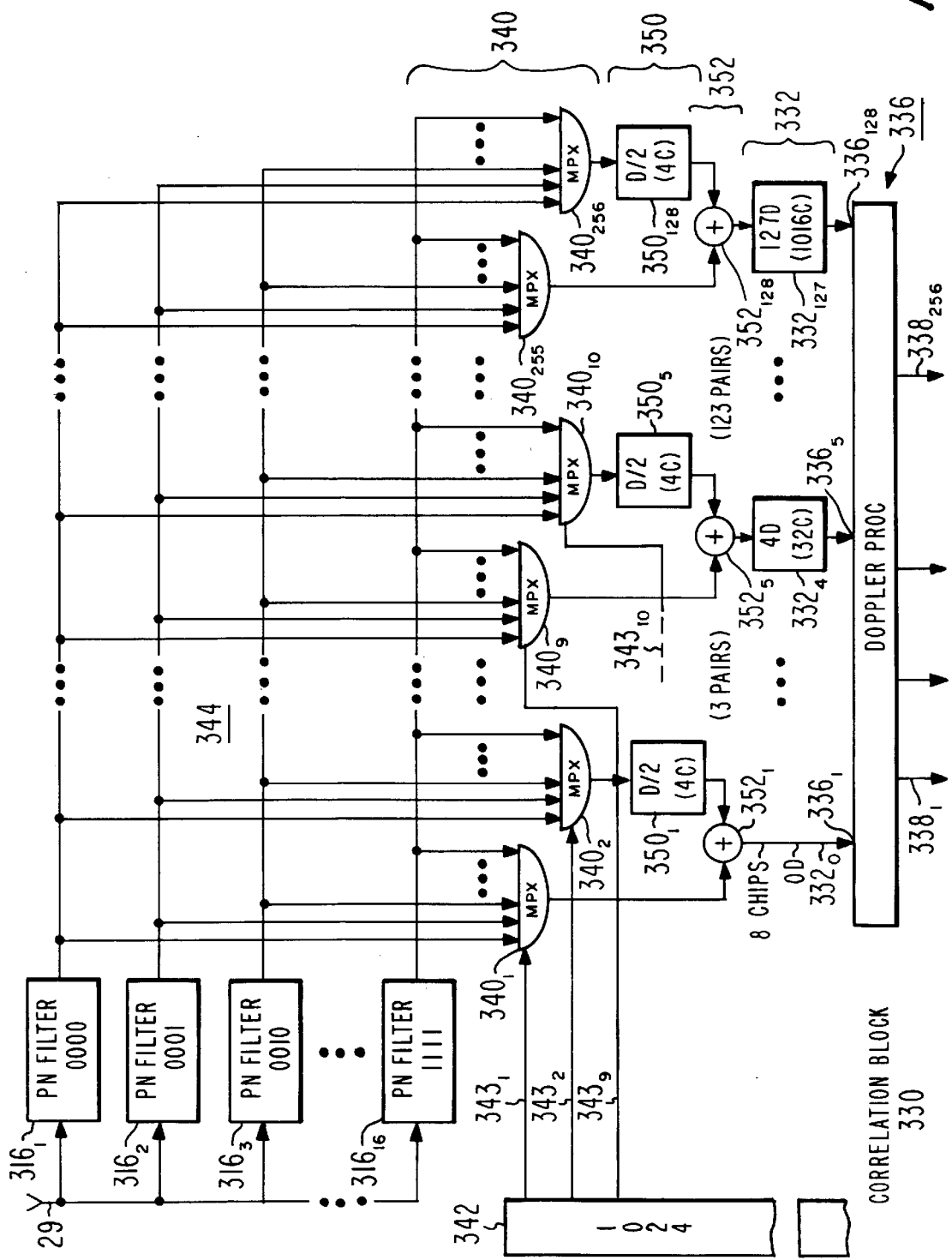
FIG. 3 is a simplified block diagram of a correlation block according to another embodiment of the invention, which may be substituted for the correlation block of FIG. 1.

FIG. 3 illustrates a correlation block 330 according to another embodiment of the invention, which substitutes for block 30 of FIG. 1. In correlation block 330, a relatively small number of short (few-chip) partial correlations creates a longer complete correlation by the use of delay and addition. The arrangement of FIG. 3 also has the advantage of simplifying the Doppler processor by reducing the number of its inputs. In FIG. 3, correlation block 330 receives sampled received signals over a signal path 29. The sampled signals are applied, in parallel, to a set 316 of sixteen four-chip partial PRN filters, which, as in the case of the filters of FIG. 2, together represent or respond to all possible four-chip sequences. The four-chip partial PRN filters include filter $316_1$, responsive to the four-chip sequence 0000, filter $316_2$, responsive to 0001, filter $316_3$, responsive to 0010, and last filter $316_{16}$, responsive to 1111. The correlation signals produced by the set of partial PRN filters 316 are applied over a network 344 to the input ports of a set 340 of multiplexers. As in the case of FIG. 2, the output signal from each partial PRN filter of set 316 is available to each multiplexer of set 340.

In FIG. 3, there are 256 multiplexers in set 340, and the multiplexers of set 340 of multiplexers are grouped into pairs. For example, multiplexers $340_1$ and $340_2$ are grouped into a pair, multiplexers $340_9$ and $340_{10}$ are grouped into a pair, and the last multiplexers $340_{255}$ and $340_{256}$ are grouped into a pair.

The arrangement of FIG. 3 includes 128 delay elements in a set 350 of delay elements, and 128 summing circuits in a set 352 of summing circuits. Within each pair of multiplexers, the outputs are relatively delayed by D/2, corresponding to a delay equal to four chips of the spreading sequence, and then summed. For example, the output of multiplexer $340_2$ is delayed by D/2 in a delay block $350_1$ of set 350 of delay blocks. The relatively delayed output of multiplexer $340_2$ and the output of multiplexer $340_1$ are added in a summing circuit $352_1$ of set 352 of summing circuits. The summed output from summing circuit $352_1$ is applied to an input port $336_1$ of set 336 of input ports of a Doppler processor 334. Similarly, the output of multiplexer $340_{10}$ is delayed by D/2 in a delay block $350_5$ of set 350 of delay blocks. The relatively delayed output of multiplexer $340_{10}$ and the output of multiplexer $340_9$ are added in a summing circuit $352_5$ of set 352 of summing circuits. The summed output from summing circuit $352_5$ is applied by way of a 4D delay element $332_4$ to an input port $336_6$ of set 336 of input ports of Doppler processor 340. In the example of FIG. 3, three additional pairs of multiplexers (and their associated delays and adders) lie (but are not illustrated) between multiplexer $340_2$ and multiplexer $340_9$. The output of multiplexer $340_{256}$ is delayed by D/2 in a delay block $350_{128}$ of set 350 of delay blocks. The relatively delayed output of multiplexer $340_{256}$ and the output of multiplexer $340_{255}$ are added in a summing circuit $352_{128}$ of set 352 of summing circuits. The summed output from summing circuit $352_{128}$ is applied by way of a 127D delay element $332_{127}$ to an input port $336_{128}$ of set 336 of input ports of Doppler processor 340. In the example of FIG. 3, one-hundred and twenty-two additional pairs of multiplexers (and their associated delays and adders) lie (but are not illustrated) between multiplexer $340_{10}$ and multiplexer $340_{255}$.

The states of multiplexers of set 340 is established by the word stored in memory 342. In operation of the arrangement of FIG. 1 with the correlation block 330 of FIG. 3, using a 1024-chip spreading sequence, the multiplexers of FIG. 3 are set much as described in conjunction with FIG. 2, to route the partial correlation peak from the partial correlation filters to the appropriate delays. The arrangement of FIG. 2 requires 255 delay elements having an average delay of about 500 chips, whereas the arrangement of FIG. 3 requires only 127 such delays, together with another 127 D/2 delays. As mentioned, the delay of D/2 in FIG. 3 represents four chips, rather than two chips, as might initially be thought. This is because the summing of two correlation words in the summing circuits of set 352 of summing circuits results in eight-chip words. Thus, the Doppler processor 334 operates on eight-chip words, and the determination of D is based on eight chips.

In operation of the arrangement of FIG. 3, the first four-bit correlation results in an output from one of the partial PRN filters of set 316, and that output is routed by multiplexer $340_2$ to delay element $350_1$, which provides a D/2 or four-bit delay. The next following (second) partial PRN correlation occurs four bits after the first correlation, and is routed by multiplexer $340_1$ directly to summing circuit $352_1$. Thus, both the first and second four-bit correlations arrive at summing circuit $352_1$, simultaneously, and are summed to produce an eight-chip word for application without delay to input port $336_1$ of Doppler processor 334. An additional six correlations occur, and are processed by portions of the arrangement of FIG. 3 which are not illustrated. At a later time, the ninth correlation occurs in one of partial PRN filters of set 316, and the ninth correlation is applied through multiplexer $340_{10}$ to delay element $350_5$, where it is delayed by four chips. One four-chip interval after the occurrence of the correlation which was routed to delay element $350_5$, the tenth correlation occurs, and is routed by multiplexer $340_9$ without delay to summing circuit $352_5$. Thus, the ninth and tenth partial correlations are summed in summing circuit $352_5$, and the resulting eight-chip word is applied by way of a 4D delay (thirty-two chip intervals) to an input port $336_5$ of Doppler processor 334. Two-hundred and forty-four additional partial correlations ensue, and are processed by portions of the correlation block 330 of FIG. 3 which are not illustrated. When the $255^{th}$ correlation peak occurs, it is routed from the corresponding one of the partial PRN filters of set 316 to D/2 delay element $350_{128}$, which delays the correlation signal by four chips. The $258^{th}$ correlation peak is routed by multiplexer $340_{255}$ directly to an input port of summing circuit $352_{128}$, where it is summed with the delayed $256^{th}$ correlation signal, to form an eight-chip-duration signal. The eight-chip duration signal from summing circuit $352_{128}$ is applied through a 127D delay element $332_{127}$ to an input port $336_{128}$ of set 336 of input ports of Doppler processor 334. The arrangement of FIG. 3 decreases the number of input samples N applied to the Doppler processor 334 by a factor of two relative to the arrangement of FIG. 1, and therefore the factor T=ND is reduced by a factor of two (assuming that D is constant). As a result, the frequency resolution 1/T is doubled.

Figure 4:
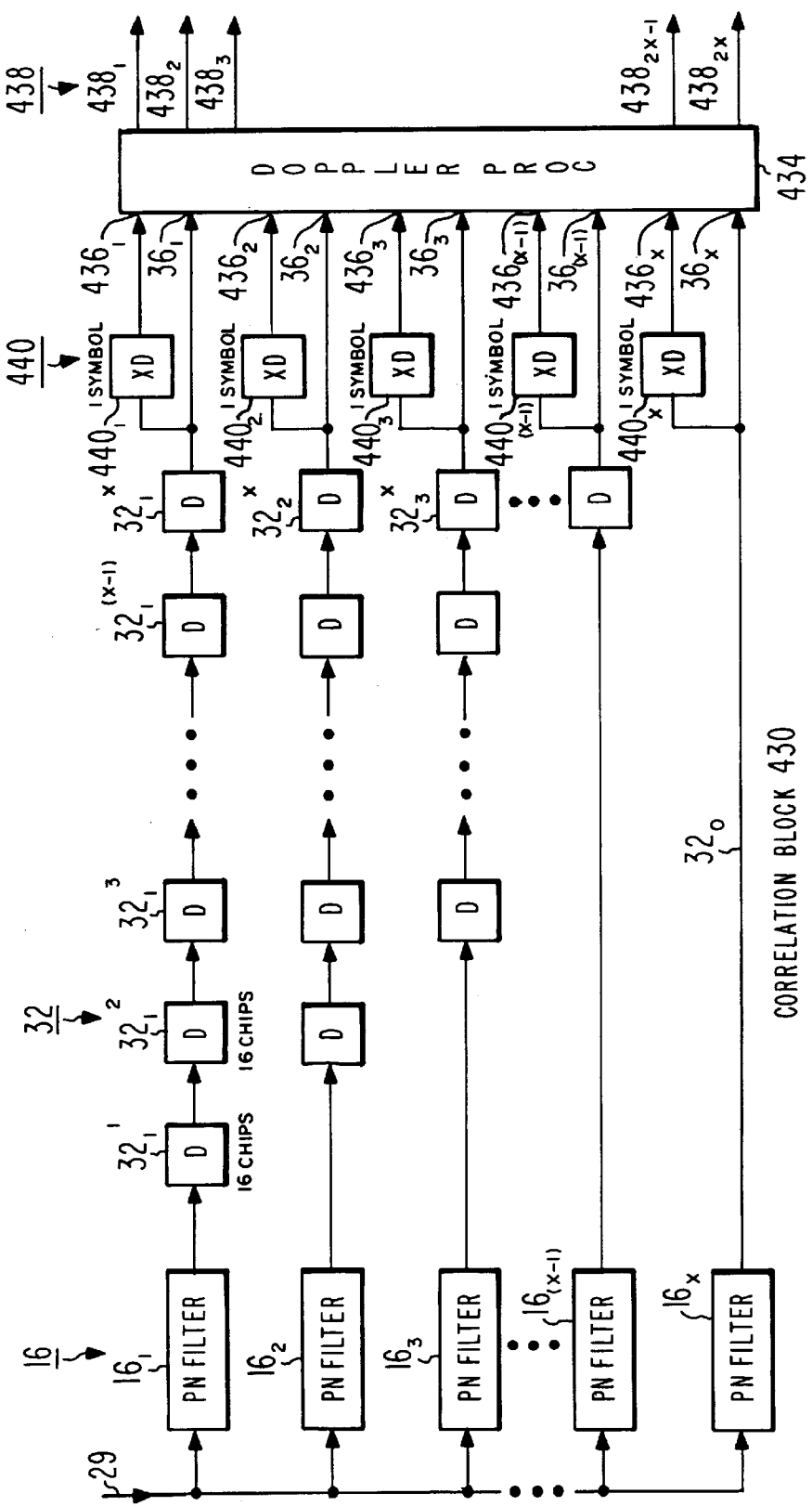
FIG. 4 is a simplified block diagram of a correlation block according to yet another embodiment of the invention, which may be substituted for the correlation block of FIG. 1.

FIG. 4 is a simplified block diagram of a correlation block 430, which may be substituted for correlation block 30 of FIG. 1. The arrangement of FIG. 4 is such as to increase, by a factor of two, the effective number of samples N applied to the Doppler processor 434 relative to the number of samples applied in the arrangement of FIG. 1, so as to modify the value of T=ND (for constant D), so that T is doubled, and 1/T is halved. With 1/T halved, the resolution of each frequency bin is doubled, and the number of frequency bins in a given bandwidth is likewise doubled. Doubling the number of frequency bins is equivalent to doubling the number of output ports of the Doppler processor, so that Doppler processor 434 of FIG. 4 has twice as many outputs as processor 34 of FIG. 1. Coherent combining over multiple symbols, (two in this particular embodiment), also enhances the total signal-to-noise ratio at the output of the Doppler processor, which is desirable in order to improve the reliability of the detection of timing and frequency estimates, especially when the signals are weak. In essence, performing the Doppler processing over multiple symbols trades complexity of Doppler processing against enhanced resolution and signal-to-noise ratio.

In FIG. 4, the partial correlation filter set 16 is identical to the corresponding filter set of FIG. 1, and the set 32 of delays is also identical. Since the elements are identical, they are designated by the same reference numerals as in FIG. 1. In FIG. 4, the delayed output from delay element $32_1^X$ is applied directly to input port $36_1$ of Doppler processor 434, and by way of an XD delay $440_1$ to an input $436_1$ of the Doppler processor. The magnitude of delay XD is the product of X, which is the number of partial PRN filters in set 16, multiplied by D, the number of chips correlated by each partial PRN filter of set 16. The product XD equals the total duration of one symbol, or the total duration of the spreading code as measured in chips, as for example 1024 in the example.

Also in FIG. 4, the delayed output from delay element $32_2^X$ is applied directly to input port 362 of processor 434, and by way of an XD delay element $440_2$ to an input port $436_2$ of processor 434. Similarly, the delayed output from delay element $32_3^X$ is applied directly to input port $36_3$ of processor 434, and by way of an XD delay element $440_3$ to an input port $436_3$ of processor 434, the delayed output from delay element $32_{(x-1)}^X$ is applied directly to input port $36_{(x-1)}$ of processor 434, and by way of an XD delay element $440_{(x-1)}$ to an input port $436_{(x-1)}$ of processor 434, and the delayed output from nondelay path 320 is applied directly to input port $36_x$ of processor 434, and by way of an XD delay element $440_x$ to an input port $436_x$ of processor 434. As mentioned, this results in a doubling of the number of ports in the set 438 of output ports of processor 434, and these output ports are designated $438_1, 438_2, 438_3, \ldots, 438_{(2X-1)}$, and $438_{(2X)}$.

Figure 5:
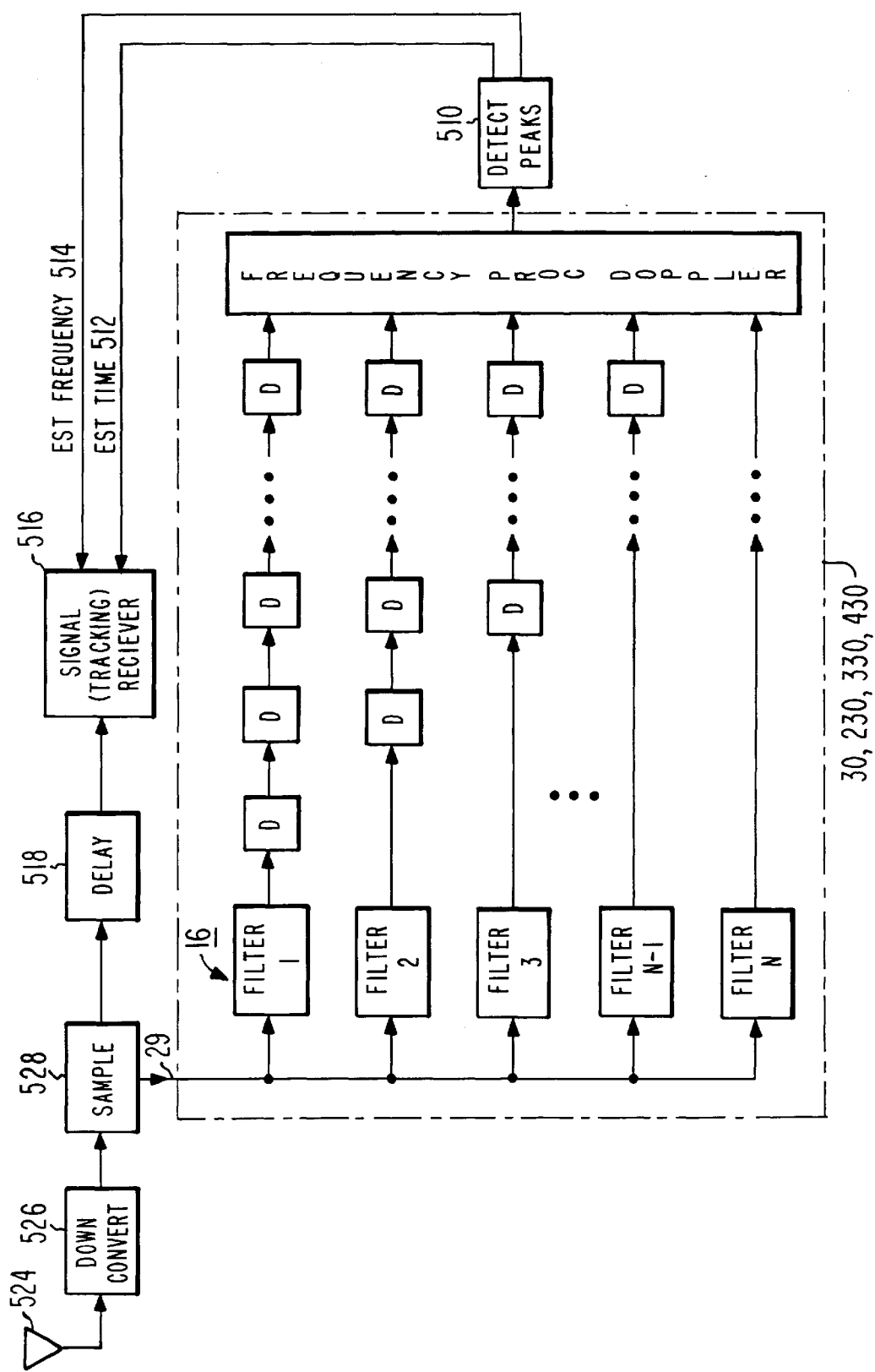
FIG. 5 is a simplified block diagram illustrating another use of a correlation block which, instead of operating on a pseudorandom spreading code, operates instead on at least portions of "header," "preamble," "training sequence," or "framing" sequences, such as are found in a burst receiver.

The arrangement of FIG. 5 represents a somewhat different use of the correlation block than those described above. Instead of operating on a pseudorandom spreading code, the various partial "PRN" filters of any of FIG. 1, 2, 3, or 4 are instead partial "header," "preamble," "training sequence," or "framing" sequence in a burst receiver. Many receivers intended for burst operation, such as for TDMA operation, use a known header or bit sequence to aid in rapid synchronization of the receiver. The header has a known code, just as the spreading sequence of a spread-spectrum transmission has a known spreading code. Consequently, the same kind of correlation block as 30 of FIG. 1, 230 of FIG. 2, 330 of FIG. 3, or 430 of FIG. 4 may be used to rapidly determine the operating frequency and the burst time in a receiver which receives such a header.

In FIG. 5, an antenna 524 receives the signal containing the header code, and a receiver 526 performs the necessary receiving functions. A sampler 528 samples the received signal, and converts to digital form. The resulting digital signals are applied to a delay element 518 and to input port 29 of any one of correlation blocks 30, 230, 330, or 430 as described above, with the "PRN" filters renamed as header filters, and matched to portions of the header code. More particularly, Filter 1 is matched to the $1^{st}$ segment of the frame header, and Filter N is matched to the Nth segment of the frame header. With such an arrangement, the Doppler processor produces an estimate of the frequency of the received signal, together with an indication of the time at which correlation occurs, which can be used for synchronization. The information produced by the Doppler processor of FIG. 5 is applied to a block 510, which detects the time at which the peak correlation occurs. The peak-correlation time and the frequency of the received signal are applied over signal paths 512 and 514, respectively, to a simple receiver or to a signal tracking receiver, illustrated as a block 516. If block 516 represents a non-tracking receiver, the frequency and correlation time are used to set the receiver frequency and the symbol timing epoch. Delay element 518 is not particularly useful with a receiver which lacks tracking, and is not absolutely necessary for a tracking receiver. Once the frequency and symbol timing information is applied to the receiver 516, the receiver is set to the values which provide proper reception. In the context of a tracking receiver, the header can provide updated frequency and timing information which the tracking receiver can use during the transmission.

Other embodiments of the invention will be apparent to those skilled in the art. For example, while the PRN code segments have been described in one embodiment as being sixteen bits long, they could be of any length less than that of the full PRN code. Similarly, while the sixteen-bit code sections have been described as being nonoverlapping, the code segments could be partially overlapping, as for example each code segment of sixteen bits could overlap four bits onto the preceding segment of code and four bits onto the succeeding segment, in which case each filter would detect only eight independent bits of the full PRN code, and twice as many filters, namely one-hundred and twenty-eight filters, would be required for correlation with a one-thousand-and-twenty-four-chip full PRN code. The signal-to-noise is not improved relative to a scheme with nonoverlapping segments by such an overlapping-code-segment scheme, so its advantage is not apparent, while the sampler 28 of FIG. 1 is illustrated as preceding the partial PRN or header filters, as may be the case in the various FIGURES, it may instead be placed (in duplicate form) following the partial PRN or header filters; this may be advantageous if the partial filters are analog, but has the disadvantage of requiring many more samplers.

Another embodiment which will be apparent to those skilled in the art involves creating or placing separate Doppler bins prior to, or upstream of, the correlation and Doppler processing operations described above, so as to resolve frequency in a two-step process. The Doppler bins in this embodiment, prior to or preceding the processing, are created by, or as a result of, mixing the received signal with different center frequencies, each corresponding to a particular Doppler bin. Then, a sample stream is created for (applied to) each of the Doppler bins, and each such sample stream is processed as described in detail above. The approach of this embodiment trades the complexity of (a) mixing with different local oscillator frequencies and parallelizing the correlation and Doppler processing algorithms with (b) the complexity incurred by not creating Doppler bins prior to correlation but using more complex Doppler processing following the correlation operations.

Thus, a method according to an aspect of the invention is for detecting the presence of, the frequency or the timing of a received spread-spectrum signal encoded at a known nominal chip rate with a known PRN sequence. The method includes the step of sampling the received signal at an integer multiple, including the multiple unity, of the chip rate, to thereby generate sampled received signals (at the output of sampler 28, or at the outputs of the various samplers if they are located at the outputs of the partial correlation filters). The sampled received signals are correlated (16, 216, 316) with at least first (one multiple-chip sequence, described as a four-chip sequence) and second (a second, different multiple-chip sequence) different portions of the PRN sequence with which the signals were originally encoded, to produce (at the outputs of filter sets 16, 216, 316) correlation outputs when correlation occurs. The samples of the correlation outputs are delayed (delays 32, 232, 350/332) by an amount equal to the time difference between the different portions of the PRN sequence, to thereby produce a plurality of time-congruent samples. The plurality of time-congruent samples are processed (34, 234, 334, 434) to determine at least the presence of, the frequency or the time of the received signal.

What is claimed is:

1. A method for detecting a characteristic of a received spread-spectrum signal encoded at a known nominal chip rate with a known pseudorandom (PRN) sequence, said method comprising the steps of:
    sampling said received signal at an integer multiple, including the multiple unity, of said chip rate, to thereby generate sampled received signals;
    correlating said sampled received signals with at least first and second different portions of said PRN sequence, to produce correlation outputs when correlation occurs;
    delaying said samples of said correlation outputs by an amount equal to the time difference between said different portions of said PRN sequence, to thereby produce a plurality of time-congruent samples; and
    processing said plurality of time-congruent samples to determine at least one of the presence, the frequency, and the time of said received signal.

2. A method according to claim 1, wherein said step of sampling is performed in a binary fashion, so that said sampled received signals have values of only zero and one.

3. A method according to claim 1, wherein said step of correlating includes the step of correlating said sampled received signals with said first and second portions includes the step of correlating said sampled received signals with first and second contiguous portions of said PRN sequence.

4. A method according to claim 1, wherein said step of delaying said samples includes the step of delaying said samples by increments of the duration of one of said portions of said pseudorandom (PRN) sequence.

5. A method for detecting a characteristic of a received time-distributed coded sequence signal encoded with a known PRN sequence at a known nominal chip rate, said method comprising the steps of:
    correlating portions of said coded sequence, less than the entirety of said coded sequence, to produce correlation signals;
    temporally aligning said correlation signals to form aligned correlation signals;
    coherently combining said aligned correlation signals; and
    determining one of the presence, frequency, and time of coherently combined aligned correlation signals.

6. A method according to claim 5, wherein said steps of coherently combining and determining one of the presence, frequency, and time are performed in a single step.

7. A method according to claim 6, wherein said single step includes one of Fast Fourier Transform (FFT) or Discrete Fourier Transform (DFT).

8. A method according to claim 7, wherein said one of said Fast Fourier Transform (FFT) or Discrete Fourier Transform (DFT) comprises parallel computation of said one of said FFT or DFT.

9. A method according to claim 5, wherein said time-distributed received coded signal is a spread-spectrum signal.

10. A method according to claim 5, wherein said time-distributed signal is a header.

* * * * *